United States Patent
Kumar

(10) Patent No.: US 8,330,291 B2
(45) Date of Patent: Dec. 11, 2012

(54) POWER GENERATION APPARATUS

(75) Inventor: Ajith Kuttannair Kumar, Erie, PA (US)

(73) Assignee: General Electric Company, Schenectady, NY (US)

( * ) Notice: Subject to any disclaimer, the term of this patent is extended or adjusted under 35 U.S.C. 154(b) by 579 days.

(21) Appl. No.: 12/572,512

(22) Filed: Oct. 2, 2009

(65) Prior Publication Data

US 2011/0080040 A1    Apr. 7, 2011

(51) Int. Cl.
*B60L 1/00*    (2006.01)
(52) U.S. Cl. ............................................. 307/9.1
(58) Field of Classification Search .............. 307/9.1
See application file for complete search history.

(56) References Cited

U.S. PATENT DOCUMENTS

| | | | |
|---|---|---|---|
| 7,116,003 B2 * | 10/2006 | Hoppe | 290/1 A |
| 2005/0039630 A1 | 2/2005 | Kumar et al. | |
| 2006/0005736 A1 | 1/2006 | Kumar | |
| 2006/0005737 A1 | 1/2006 | Kumar | |
| 2006/0102790 A1 * | 5/2006 | Atkey et al. | 244/134 R |
| 2007/0144398 A1 | 6/2007 | Kumar et al. | |
| 2007/0145918 A1 | 6/2007 | Kumar et al. | |
| 2007/0155570 A1 * | 7/2007 | Kimura et al. | 475/153 |
| 2008/0103632 A1 * | 5/2008 | Saban et al. | 700/286 |
| 2010/0072959 A1 * | 3/2010 | Dooley | 322/90 |
| 2010/0094490 A1 * | 4/2010 | Alston et al. | 701/21 |
| 2012/0001481 A1 * | 1/2012 | Koeppen et al. | 307/9.1 |
| 2012/0025604 A1 * | 2/2012 | Baumann et al. | 307/9.1 |

FOREIGN PATENT DOCUMENTS

| | | |
|---|---|---|
| EP | 0 536 876 | 4/1993 |
| EP | 1 022 218 | 7/2000 |

* cited by examiner

*Primary Examiner* — Daniel Cavallari
(74) *Attorney, Agent, or Firm* — GE Global Patent Opertation; John A. Kramer

(57) ABSTRACT

An apparatus including an alternator that is drivable by an engine for producing a first AC electric current, a rectifier in electrical communication with the alternator for producing a DC electric current, an inverter in electrical communication with the rectifier for producing a second AC electric current where the second AC electric current having an acceptable frequency and/or voltage, and the inverter in electrical communication with one or more electric loads responsive to the second AC electric current, and an energy storage device that is able to electrically couple to the alternator, rectifier, and/or inverter.

18 Claims, 5 Drawing Sheets

POWER GENERATION APPARATUS

BACKGROUND OF THE INVENTION

Embodiments of the invention may relate to a powered system, such as a marine vessel and/or off-highway vehicle and, more particularly, to an improved power generation apparatus or system for use with the powered system.

Marine propulsion systems may include one or more internal combustion engines for propelling the vessel by turning a shaft that rotates a propeller. The engines also may supply power to a generator to supply the vessel's electrical loads, for example, for auxiliary drives, which in turn convert electrical power to mechanical power, electrical devices for producing heat, cooling, and light, electrical devices for media technology, and electrical devices for other nautical systems.

Current marine propulsion systems (and off-highway vehicle propulsion systems) employ one or more constant-speed engines to produce turning-torque, or providing rotational forces, for an AC alternator. The alternator generates constant AC current, or frequency, and supplies it to an AC bus. The bus supplies power to motor loads on the marine vessel, including propeller motor drives, thrust motors drives, and other motor drives. The bus also supplies electricity to various hotel loads, i.e., other electrical loads (non-motor loads) that are operational on the marine vessel. Transformers for raising or lowering the AC voltage or for isolation, as required by the motor and non-motor loads, may be interposed between the alternator and the AC bus.

The marine propulsion system may include multiple parallel-connected alternators (driven independently by diesel-powered or other internal combustion engines) feeding a common AC electric bus. However, the alternator outputs must be in-phase, requiring the alternators to be synchronized. Also, reactive AC current (the out-of-phase portion of the AC wave) does little useful work. Such reactive power is pervasive in conventional marine power plants, resulting in reduced voltage levels, the undesirable heating of equipment and wires, and wasted energy. Maintaining stability of this AC system is complex; all alternators must remain in phase. Alternator stability issues include hunting, maximum power-pullout angle, effects of faults, out-of-phase transfers, and load transients. Also, the constant-speed engines may exhibit relatively poorer fuel efficiency due to the required constant speed operation.

FIG. 1 illustrates a prior art configuration showing first and second engines 12 and 14, each supplying rotational energy to a respective alternator 18 and 20. Two transformers 24 and 26 are fed electricity by the respective alternators 18 and 20 at a first voltage and supply electricity at a second voltage to an AC bus 30. Various motor load drives 32, 34 and 36 and a non-motor load 38 are connected to the AC bus 30 as illustrated. The configuration shows the alternator 18/transformer 24 and the alternator 20/transformer 26 in parallel; each the output signals from the transformer 24 and the transformer 26 must operate at the same voltage and at the same frequency. Alternately, the transformers 24 and 26 could be combined into one. Because of this need for synchronization of the alternators, creating this condition requires both the engines 12 and 14 to operate at the same speed.

Another system includes a DC bus and an active front end (a controlled rectifier) to convert the AC to DC for supplying electricity to the DC bus. This system is illustrated in FIG. 2 with active front ends (AFE's) 40 and 42 supplying current to a DC bus 46. The bus 46 supplies DC electricity to DC motors on the marine vessel, including propeller motors 50, thrust motors 52, and other motors 54. The bus 46 is connected to and supplies electricity to other loads and hotel loads 56.

The active front ends 40 and 42 comprise IGBTs used as a rectifier (such as in an IGBT bridge), rather than a diodes used in a diode bridge. The term "IGBT" refers to an insulated gate bipolar transistor. The complexity and, therefore, the cost, of the AFE's 40 and 42 are relatively high. The IGBTs rectify the AC supply to produce the current for the DC bus 46. The IGBT bridge is supplied via a three phase reactor and the IGBTs are controlled with a pulse width modulation waveform such that a sinusoidal current is drawn from the supply. When a drive is regenerating, the DC bus voltage is regulated by the active front end, and the power flows to other loads which are consuming electrical power. In both cases, the speed of the engines 12 and 14 cannot be varied to attain better fuel efficiency.

It may be desirable to have a propulsion system that has different characteristics than those of the currently available systems to improve fuel efficiency while also minimizing part count and overall complexity.

BRIEF DESCRIPTION OF THE INVENTION

An embodiment of the invention provides an apparatus that includes an alternator that is drivable by an engine for producing a first AC electric current, and a rectifier in electrical communication with the alternator for producing a DC electric current. The apparatus also comprises an inverter in electrical communication with the rectifier for producing a second AC electric current. The second AC electric current has an acceptable frequency and/or voltage. The apparatus also comprises the inverter in electrical communication with one or more electric loads responsive to the second AC electric current, and an energy storage device that is able to electrically couple to the alternator, rectifier, and/or inverter.

Another embodiment of the invention provides for an apparatus that includes a plurality of alternators each driven by a respective variable speed engine for producing a respective first AC electric signal, a plurality of rectifiers each in electrical communication with a respective one of the alternators for producing a respective DC electric signal, and a DC bus connected to an output of at least one of the rectifiers. The apparatus further comprises an inverter in electrical communication with the DC bus for producing a second AC electric signal, a first electric load in electrical communication with the inverter and responsive to the second AC electric signal, and an energy storage system coupled to the DC bus for controllably receiving electrical power from the DC bus and providing electrical power to the DC bus.

Another embodiment of the inventions provides for an apparatus having an alternator driven by a variable speed engine for producing a first AC electric signal, a rectifier in electrical communication with the alternator for producing a DC electric signal, and a DC bus connected to an output of the rectifier. The apparatus further comprises an inverter in electrical communication with the DC bus for producing a second AC electric signal, a first electric load in electrical communication with the inverter and responsive to the second AC electric signal, and an energy storage system coupled to the DC bus for controllably receiving electrical power from the DC bus and providing electrical power to the DC bus. The apparatus further comprises a generator system coupled to an output of a constant speed engine for producing a third AC electric signal, and at least one switch electrically connected to the inverter and to the generator system for selectively providing the second and third AC electric signals, respectively, to a second electric load.

BRIEF DESCRIPTION OF THE DRAWINGS

A more particular description of the invention briefly described above will be rendered by reference to specific embodiments thereof that are illustrated in the appended drawings. Understanding that these drawings depict only typical embodiments of the invention and are not therefore to be considered to be limiting of its scope, exemplary embodiments of the invention will be described and explained with additional specificity and detail through the use of the accompanying drawings in which.

The various described features are not drawn to scale, but are drawn to emphasize specific features relevant to embodiments of the invention. Reference characters denote like elements throughout the figures and text.

DETAILED DESCRIPTION OF THE INVENTION

Figure 1:
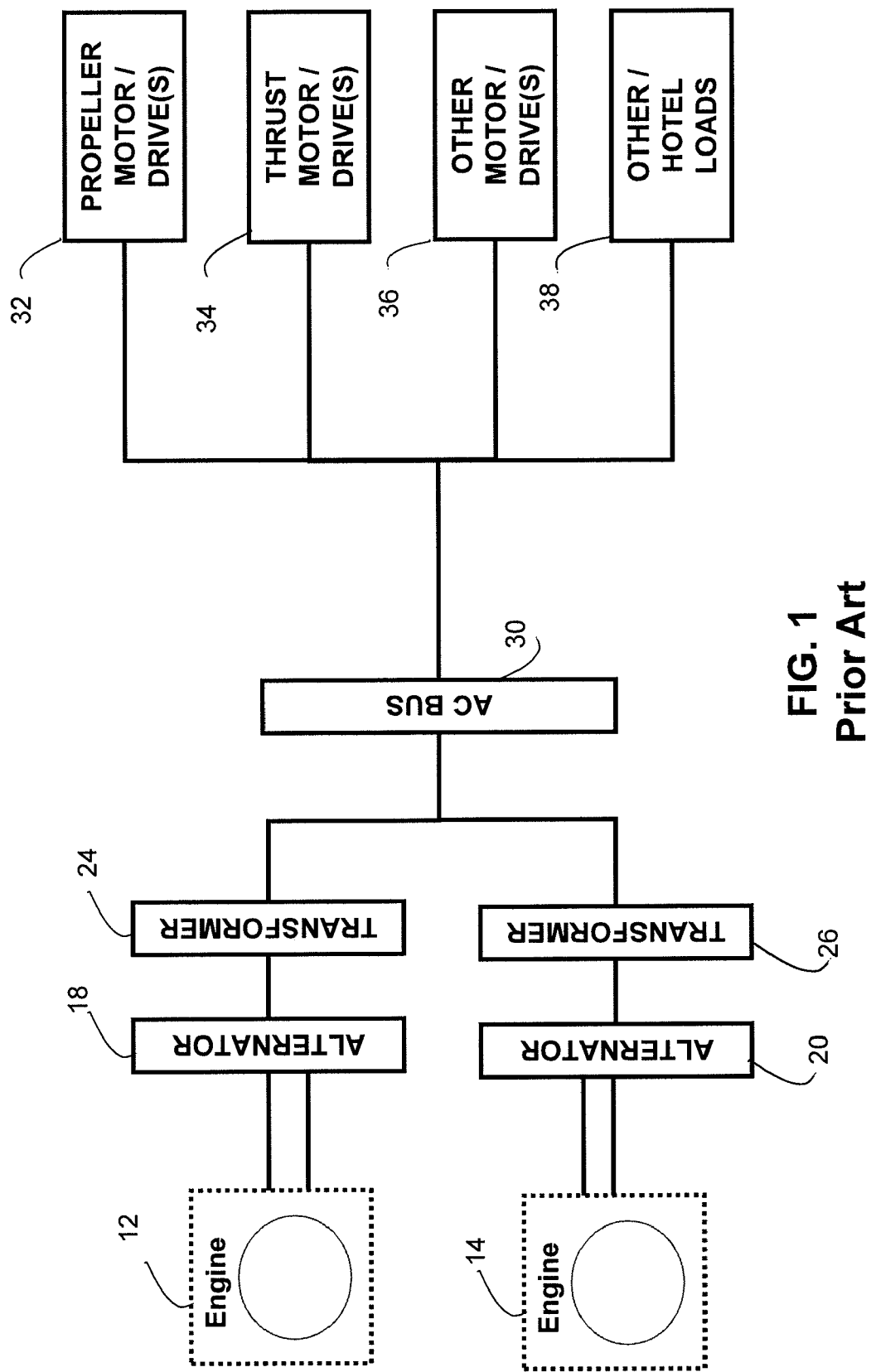
FIG. 1 is a schematic representation that illustrates a prior art propulsion drive configuration for a marine vessel.
Figure 2:
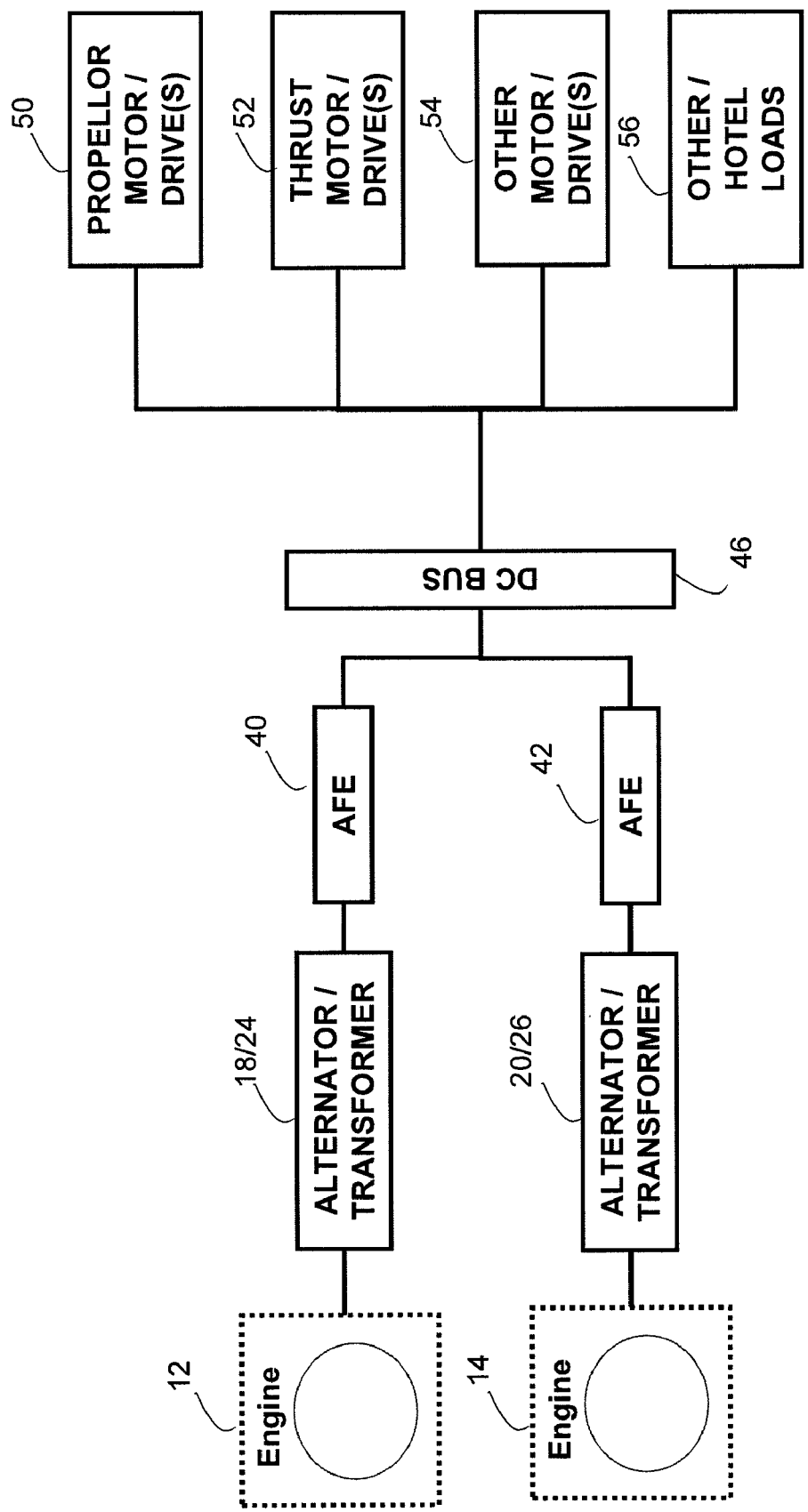
FIG. 2 is another schematic representation that illustrates a prior art propulsion drive configuration for a marine vessel.

Embodiments of the invention may relate to a power generation apparatus or system. Embodiments of the invention may relate to drive configurations for such power generation systems. In some embodiments, the power generation system and/or driver configurations are used on a marine vessel or an off-highway vehicle (e.g., train, construction equipment, mining equipment).

As used herein, the following definitions apply. An alternator is an electromechanical device that converts mechanical energy to alternating current electrical energy. A rectifier is an electrical device that converts alternating current (AC) to direct current (DC). An inverter is an electrical device that converts direct current (DC) to alternating current (AC); the resulting AC may be at any required voltage and frequency with the use of appropriate transformers, switching, or control circuits. A controller-area network (CAN or CAN-bus) is a vehicle bus standard designed to allow microcontrollers or other controllers and devices to communicate with each other within a vehicle or other powered system without a host computer.

In some embodiments, a controller or other control system can communicate with various components through a CAN bus. The controller, and optionally an array of sensors, can be selected based on application specific needs and parameters.

In differing embodiments, series-connected and parallel-connected alternator configurations are provided. These configurations, relative to currently available systems, may provide one or more features. Some of these features may be to reduce the weight, cost, and complexity of drive systems while increasing the fuel efficiency of these systems. Some of the embodiments may utilize a variable speed engine, such as but not limited to one that provides a non-zero, but different amount of power via a corresponding alternator to a propulsion motor relative to another variable speed engine, to drive the alternators without the presence or use of transformers, filters, or active front-end devices to supply the primary vessel/vehicle drive power. One embodiment of the invention may supply battery back-up capability. And, the variable speed engine may supply a constant frequency output and/or constant voltage for use in constant-frequency applications.

In one embodiment, a common AC bus is either not present or is isolated from the alternators to avoid the need to synchronize the alternators. One method is to rectify the AC currents (from each alternator) and have the rectifiers communicate through a DC bus. While this may necessitate an inverter disposed between the DC bus and any propulsion loads, with a commensurate loss of efficiency, it does decouple the alternators from one another (in terms of synchronization) and therefore further decouples the engines that drive the alternators. While this may not provide as large an advantage for constant speed engines, such decoupling allows for more control flexibility for variable speed engines.

With regard to the energy storage device, a suitable energy storage device can include one or more separate storage components, and the components can be the same or different from each other in, for example, function or composition or type. Some examples may be illustrative. The energy storage device can include a high energy density battery plus a power battery; an energy or power battery plus a capacitor or quick capture/release device; or a flywheel plus a battery, and so on, depending on application specific parameters. The energy storage device can include a sodium metal halide battery, a sodium sulfur battery, a lithium-based battery, a nickel metal hydride battery, a nickel cadmium battery, or a lead acid battery, and these can be used alone or in combinations as appropriate based on the system needs. Each of these foregoing batteries may be included with other storage types, such as mechanical storage, chemical storage, pressure storage, or thermal storage. Mechanical storage can include flywheels or springs. Chemical storage can include fuel cell reactants (e.g., hydrogen, oxygen, or the like). Pressure and thermal storage are self-evident.

Where present, an exciter can control the voltage produced by the alternator. The exciter can be, for example, a phase-controlled rectifier if the input to the exciter is AC. In one embodiment, the controller or other control system can control the exciter.

Figure 3:
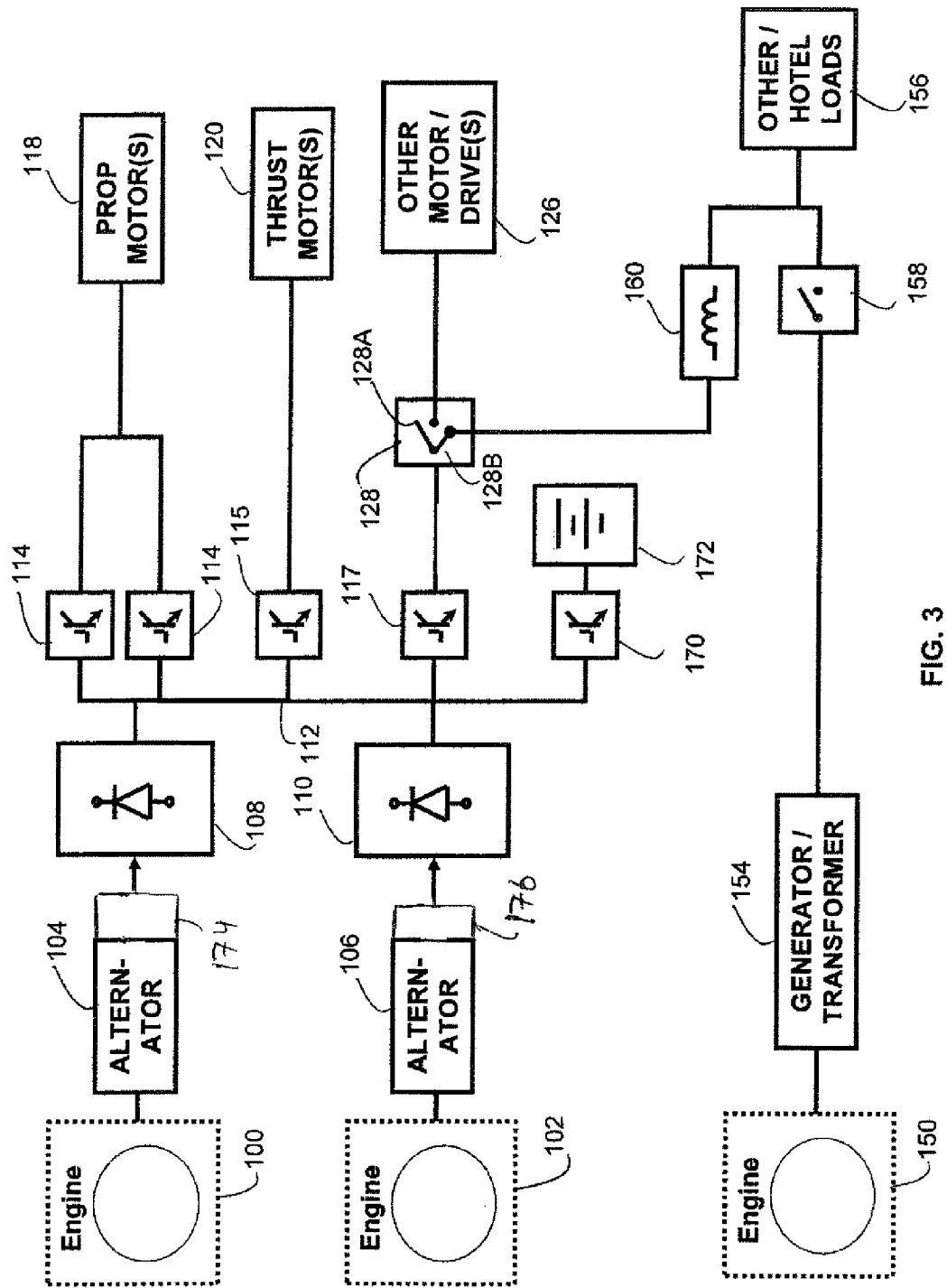
FIG. 3 depicts a schematic illustration of an improved propulsion drive configuration with power generation apparatus, according to an embodiment of the present invention.

FIG. 3 illustrates an improved propulsion drive configuration with power generation apparatus, according to an embodiment of the present invention. The apparatus includes first and second alternators 104, 106, each of which is drivable by an engine for producing a respective first AC electric current. In the embodiment of FIG. 3, variable speed diesel engines 100 and 102 each supplies rotational energy to a respective one of the alternators 104 and 106 for generating an AC current/signal supplied to a respective rectifier 108 and 110. Each rectifier 108, 110 is in electrical communication with a respective one of the alternators 104, 106 for producing a DC electric current/signal. The resulting DC signal from the rectifiers 108 and 110 is supplied to a DC bus 112. In this configuration, a constant voltage is supplied from the alternator to the corresponding rectifier even as the engine speed of the variable speed engine is varied. Additionally, each alternator may be separately controllable. Thus, even as each respective engine 100 and 102 provides a different power input to its respective alternator, the respective alternator is able adjust to provide the same and/or a constant voltage output.

For example, the field current of the engines 100 and 102 can be varied to control the output voltage of the parallel-connected alternators 104 and 106 and to apportion the power/current between the alternators 104 and 106. The alternators may be independently varied, or separately controlled to provide for controlling the output voltage. It is not required that the engines 100 and 102 operate at the same speed. The alternators 104 and 106 can supply the required current at equal voltages. Exciters 174, 176 that are part of the alternator can respond to control signals from the controller 151 (or other control system) to adjust the voltage and/or current independent of the coupled engine speed and to control the power flow from each engine. In another embodiment, the alternators respond to variations in engine speed and/or power output from the respective engine to adjust the voltage and/or current so that a constant value is maintained.

The apparatus includes an inverter (or more than one inverter) 114, 115, and/or 117, each of which is in electrical communication with one or more of the rectifier(s) 108 and/or 110 for producing a respective second AC electric current. The second AC electric current has a frequency, voltage, or both frequency and voltage that is acceptable for an intended load. Those skilled in the art will recognize that the use of the term "acceptable" means that the second AC electric current may be a determined current that is compatible with the intended load, where this current may be pre-determined and or designated based on the electrical power flowing through the rectifier, DC bus, and inverter to the intended load.

Inverters 114 and 115, for example, convert the DC signal on the DC bus 112 to AC to drive a propulsion motor(s) 118 ("prop motor") and a thrust motor(s) 120, to provide propulsion force. An inverter 117 supplies AC electricity to, or energizes, other motors or other drives 126 through a first switch 128. For example, the inverter 117 may be configured to energize a motor or other drive 126 when the first switch 128 is in a first state, e.g., an inner switch portion 128A is closed between terminals of the inverter 117 and motor/drive 126. As should be appreciated, each motor 118, 120 or other motor/drive 126 or other load 156 constitutes an electric onboard load (meaning a device that consumes electrical power that is located on a marine vessel, off-highway vehicle, or other powered system); thus, each inverter 114, 115, 117 is in respective electrical communication with one or more electric loads 118, 120, 126, and/or 156 that are responsive to the second AC electric current produced by the inverter.

Continuing with FIG. 3, a constant speed engine 150 supplies power (e.g., the power transferred via rotational forces of the engine) to a generator system 154 operable to produce AC electrical energy. The generator system may be an alternator, a generator and transformer, a generator and inverter, or the like (a generator/transformer is shown in the drawings for illustration purposes). When a second switch 158 is controlled to a closed condition the generator/transformer 154 supplies AC electricity to other loads/hotel loads 156 and also provides isolation. Use of the constant speed engine 150 is sufficient because the other loads/hotel loads 156 operate properly from a fixed frequency source.

Additionally, with the second switch 158 in an open condition and the first switch 128 in a second state (e.g., a second inner switch portion 128B is closed), the inverter 117 can provide power to (energize) other/hotel loads 156, after passing through an AC filter/transformer 160, which ensures that the correct voltage and voltage harmonics is supplied to the loads. Alternately, the first transformer (that is in association with the generator; collectively 154) and second transformer 160 can be combined, depending on the voltage levels of the generator 154 and inverter 117. Thus, the topology of FIG. 3 can supply two or more different voltages/currents (e.g., a first voltage from the rectifiers 108 and 110, a second voltage from the generator/transformer 154, and a third voltage from the battery 172). As illustrated, switch 158 may be a two-way switch, whereas switch 128 may be a three-way switch having a first inner switch portion 128A and a second inner switch portion 128B, controlled to determine a flow of power as required. As should be appreciated, the switch 128 may be a SPDT switch (such that inverter 117 is always connected to either motor/drive 126 or transformer 160), a SP3T switch (providing a third state for an open-circuit condition between the inverter 117 and motor/drive 126 and transformer 160), or the like. Switch portions 128A, 128B are shown for illustrative purposes, and it may be the case that the switch 128 includes only one inner switch portion, or more than two, for effectuating the two or more states.

First and second parallel engines 100 and 102, first and second parallel alternators 104 and 106, and first and second parallel rectifiers 108 and 110 may supply the current requirements of one or more propulsion motor(s) 118 and the thrust motor(s) 120. Also, two parallel inverters 114 are illustrated for an optional application where a single inverter cannot supply the current required to drive the propulsion motor 118.

A DC-DC converter 170 connected to the DC bus 112 charges a battery or other energy storage device 172 as required to maintain a full battery charge. Depending on the embodiment in question, the battery or other energy storage device 172 is able to electrically couple to the alternator, rectifier, and/or inverter; for example, as shown in the embodiment in FIG. 3, the battery or other energy storage device 172 is coupled to the DC bus 112 through the DC-DC converter 170 and, therefore, to the rectifiers 108, 110 and inverters 114, 115, 117. The battery 172 can supply current to the propulsion motor(s) 118, the thrust motor(s) 120, the other motor/drive(s) 126 and, when the switch 128 is in a state where switch portion 128B is closed, to the other loads/hotel loads 156. Different configurations are possible; for example, in the embodiment of FIG. 5 a battery 202 is electrically coupled to the alternator 106 through a power electronics module 200 (explained in more detail below).

In the embodiment shown in FIG. 3, only the generator/transformer 154 is required to carry the full current output from the engine 150. The generator/transformer 154 can be sized based on the relatively lower current capacity of the engine 150. The power from engines 100 and 102, provided to most of the loads, such as the propulsion motor(s) 118, thrust motor(s) 120, and the other motor/drive(s) 126, need not go through transformers since these loads can generally run without isolation. The speeds of the engine 100 and 102 can be varied depending on the fuel efficiency characteristics and the load on the DC bus 112.

Figure 4:
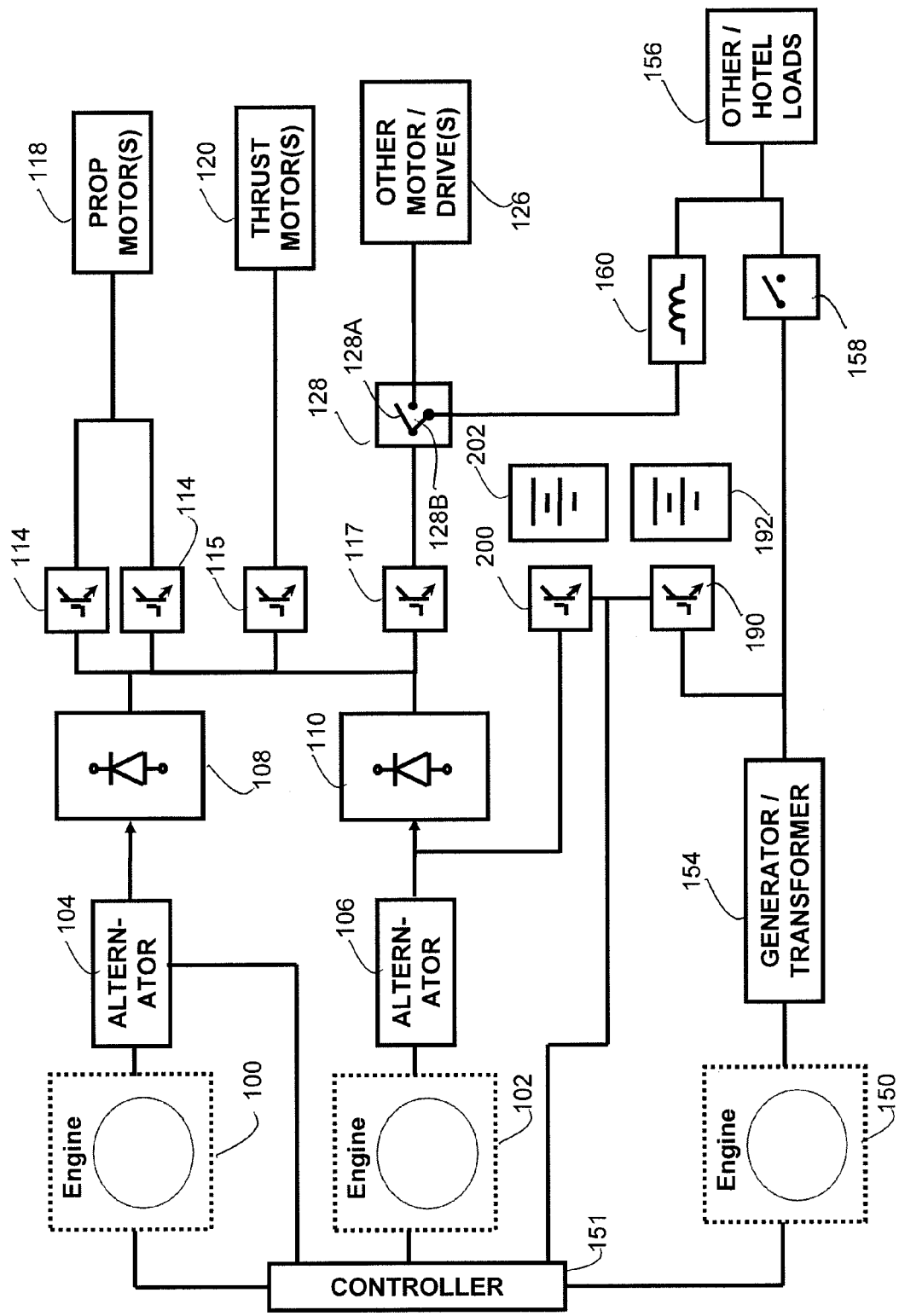
FIG. 4 depicts a schematic representation that illustrates another improved propulsion drive configuration with power generation apparatus.

FIG. 4 illustrates two or more embodiments. In one embodiment, the generator/transformer 154 can supply AC electric current to a rectifier/inverter 190. The rectifier/inverter can then supply DC current to charge a first battery 192. In an alternative or additive embodiment, the alternator 106 can supply AC electric current to a power electronics module 200 that accepts AC current from the second alternator 106, and in turn supplies DC current to charge a second battery 202. A suitable power electronics module may include an AC to DC inverter, a converter, and/or any other device as needed.

The power in the first or second battery, depending on which is desired and/or which is present and charged, can be provided back into the system to drive the hotel load, the other motor/drive, the thrust motor, or the propulsion motor. These are controlled by the state of the corresponding switches, which is controlled by a controller 151 or other control system. For illustration, the "other control system" is represented by the controller 151. Those skilled in the art will recognize that the controller 151 or other control system may effect control based on an operating condition of the system and/or allow for an operator to command the controller 151 or other control system. When the respective engines are not running, the first battery 202 can supply power to loads 118, 120, and 126, and the second battery 192 can supply power to the load 156, with the switches 128 and 158 properly configured. Any reactors/filters/transformers required for converter 190 are assumed and not shown. They can be combined with the first transformer 154 and/or the second transformer 160 with appropriate switch gear arrangement.

The battery 202 can be charged by action of the engine 102 and the alternator 106; the battery 192 can be charged by action of the engine 150 and the generator/transformer 154. Off-board power (not shown in FIG. 4) can also charge the first and second batteries 192 and 202. For example, in the case where the system of FIG. 4 is deployed on a marine vessel, off-board power may be provided when the vessel is docked. Additionally, one or more of the electric loads, including but not limited to, propeller motors, thrust motors, and hotel loads are chargeable from the off-board source.

During use, where the first battery is present, the constant speed engine may produce more power and the generator/transformer more electricity, than can reasonably be taken up by the hotel load(s) or other load 156. The controller 151 or other control system may opt to run the constant speed engine at an optimized determined level, and capture the electricity within the first battery. The term "optimized" may refer to a determined level based on such parameters as equipment life, fuel consumption, exhaust emissions, and the like.

Figure 5:
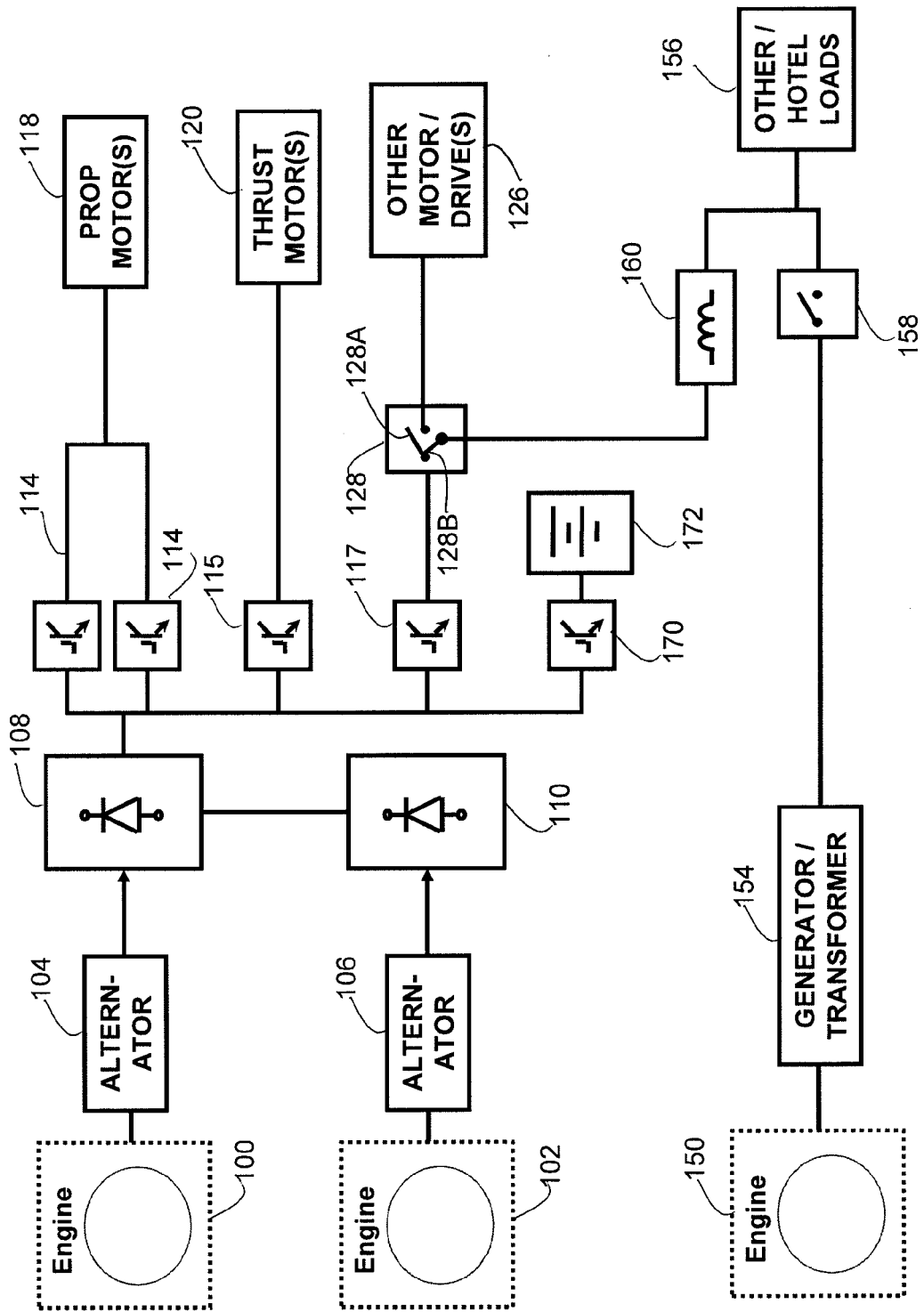
FIG. 5 depicts a schematic representation that illustrates another propulsion drive configuration with power generation apparatus.

FIG. 5 illustrates an exemplary embodiment wherein the rectifiers 108 and 110 are connected in series such that the total voltage on the DC bus 112 is the sum of the voltage developed across the rectifier 108 and the voltage developed across the rectifier 110. Thus, each voltage can be independently established and the speed of each engine can be independently established to produce the desired total voltage. The currents developed by each of the rectifiers 108 and 110 are approximately equal when both the first and second engines 100 and 102 are operating to produce a voltage.

In an embodiment, the apparatus includes a battery or other energy storage device 172, 202. The apparatus further comprises a DC bus 112 for carrying a DC current, a first switch 128 interposed between the DC bus and first electrical loads 126, and a constant-speed engine 150 for supplying rotational forces to a generator and transformer 154. The energy storage device is able to electrically couple to the alternator, rectifier, and/or inverter, via the DC bus or otherwise; that is, the energy storage device may be electrically coupled, directly or indirectly, to an alternator output/input, or to a rectifier output/input, or to an inverter output/input, via the DC bus or otherwise. In one embodiment, the energy storage device is controlled for selectively receiving electrical power from or providing electrical power to the DC bus, an alternator(s), a rectifier(s), and/or an inverter(s). The first switch 128 has a first state 128A for energizing the first electrical loads from the DC bus 112 and a second state 128B for energizing the first electrical loads from the generator and transformer. An additional energy storage device 192 is coupled to the generator and transformer such that the first switch is interposed between the additional energy storage device and the first loads.

In the various illustrated embodiments, one or more of the engines 100, 102, and 150 can be idled or shut down, and one or more of the batteries 172, 192, and 202, if present and charged, may be operated to power the illustrated loads. Fuel efficiency may be attained when an engine is shut down or driven at different speeds/power or powered down while the battery continues to supply the load.

Although the various figures show plural alternators, rectifiers, etc., in one embodiment the power generation apparatus comprises an alternator 104, a rectifier 108, an inverter (e.g., such as an inverter 114, 115, or 117 as in FIG. 3), and an energy storage device (such as energy storage device 172 in FIG. 3). The alternator 104 is drivable by an engine 100 for producing a first AC electric current. The rectifier 108 is in electrical communication with the alternator 104 for producing a DC electric current from the first AC electric current. The inverter 114, 115, or 117 is in electrical communication with the rectifier 108 for producing a second AC electric current. The second AC electric current has an acceptable frequency and/or voltage. The inverter is also in electrical communication with one or more electric loads (e.g., such as loads 118, 120, 126, 156 in FIG. 3) responsive to the second AC electric current. The energy storage device is able to electrically couple to the alternator, rectifier, and/or inverter.

Another embodiment relates to a power generation apparatus comprising a plurality of alternators 104, 106, a plurality of rectifiers 108, 110, a DC bus 112, an inverter (114, 115, 117, or 190), a first electric load (118, 120, or 126), and an energy storage system (170 and 172, or 200 and 202). Each alternator 104, 106 is driven by a respective variable speed engine 100, 102 for producing a respective first AC electric signal. Each of the plurality of rectifiers 108, 110 is in electrical communication with a respective one of the alternators 104, 106 for producing a respective DC electric signal. The DC bus 112 is connected to an output of at least one of the rectifiers (e.g., for receiving and carrying the DC electric signal produced by the rectifier(s)). The inverter (114, 115, or 117) is in electrical communication with the DC bus for producing a second AC electric signal. The first electric load (118, 120, or 126) is in electrical communication with the inverter (114, 115, or 117) and responsive to the second AC electric signal. The energy storage system (170 and 172, or 200 and 202) is coupled to the DC bus 112 for controllably receiving electrical power from the DC bus and providing electrical power to the DC bus.

For controllably receiving electrical power from the DC bus and providing electrical power to the DC bus, the energy storage system may be controlled by a controller 151 or other control system. For example, the energy storage system may be controlled for receiving electrical power from the DC bus when the energy storage system is at less than a full charge level and excess power is available on the bus, and the energy storage system may be controlled for providing electrical power to the DC bus when there is less electrical power available on the DC bus than required by the loads drawing power from the DC bus.

In another embodiment, the apparatus further comprises a constant speed engine 150, a generator system 154, and at least one switch (120 and/or 158). The generator system is coupled to an output of the constant speed engine for producing a third AC electric signal. The at least one switch is electrically connected to the inverter (117 or 190) and to the generator system for selectively providing the second and third AC electric signals, respectively, to a second electric load 156.

Another embodiment relates to a power generation apparatus comprising an alternator (104 and/or 106), a rectifier (108 and/or 110), a DC bus 112, an inverter (114, 115, 170, and/or 190), a first electric load (118, 120, and/or 126), an energy storage system 170, 172, a generator system 154, and at least one switch (128 and/or 158). The alternator is driven by a variable speed engine (100 and/or 102) for producing a first AC electric signal. The rectifier is in electrical communication with the alternator for producing a DC electric signal. The DC bus is connected to an output of the rectifier. The inverter is in electrical communication with the DC bus for producing a second AC electric signal. The first electric load is in electrical communication with the inverter and responsive to the second AC electric signal. The energy storage system is coupled to the DC bus for controllably receiving electrical power from the DC bus and providing electrical power to the DC bus. For example, the energy storage system may be controlled by a controller 151 or other control system. The generator system is coupled to an output of a constant speed engine 150 for producing a third AC electric signal. The at least one switch is electrically connected to the inverter and to the generator system for selectively providing the second and third AC electric signals, respectively, to a second electric load 156.

In any of the aforementioned embodiments, the first electric load may be a traction motor (meaning a motor for providing movement force), such as a propeller motor, thrust motor, wheel motor, or the like, and the second electric load may be a hotel load (meaning, unless otherwise specified, a load other than a traction motor; the hotel load may be a non-motor load). The power generation apparatus may be deployed as part of a propulsion drive configuration for a marine vessel or off-highway vehicle.

In certain embodiments, the power generation apparatus may not include an energy storage device or system. In one such embodiment, the apparatus comprises an alternator (driven by a variable speed engine), a rectifier for producing DC electricity from a first AC signal produced by the alternator, a DC bus connected to the output of the rectifier, an inverter connected to the DC bus for producing a second AC signal from the DC electricity present on the bus, and a first electric load driven by the second AC signal. The first electric load may be a traction motor or other drive unit. In another embodiment, the apparatus further comprises a generator system driven by a constant speed engine for producing a third AC signal. A second electric load (e.g., hotel load) is powered by the third AC signal. In another embodiment, a switch is provided to selectively connect the second electric load to the output of the generator system (the third AC signal) or to an inverter that produces an AC signal off the DC bus (this inverter may be the inverter that produces the second AC signal or an additional inverter).

The previously discussed embodiments may be applicable to such powered systems as a marine vessel. For example, in operation on a powered system, such as but not limited to a marine vessel, low motive power may be commanded, requested, and/or required, such as but not limited to when approaching a port, dock, another marine vessel, and/or shore. The controller 151 may respond to the low motive power command by stopping or reducing the engine speed of only one, or more, of the variable speed engines of the plurality. In an exemplary embodiment, low motive power may be commanded and/or requested by an operator. When providing low motive power, if additional power is required for one of the loads on the marine vessel, the controller 151 may command power from one of the batteries 192, 202 to be provided to the respective load.

Also when in operation, the controller is further operable to differentially control a speed of a plurality of engines in response to a signal that corresponds to one or more variables, such as, but not limited to, vehicle speed, emission levels, fuel consumption, and/or equipment life. More specifically, the controller and sensors (not illustrated) on the powered system (such as but not limited to sensors collecting information, and/or providing a signal with information, about such variables as vehicle speed, emission levels, fuel consumption, and/or equipment life) are in communication wherein the controller may control the speed of any one of the plurality of engines in response to any one of the variables being measured by the sensors. In another exemplary embodiment, controller may control each engine of the plurality of engines with minimum to no operator input. In other words, based on a sensor reading, the controller may control speed. Those skilled in the art will recognize that this may occur in a closed loop configuration between the controller, sensor, and each engine.

In this specification and the claims that follow, reference will be made to a number of terms that have the following meanings. The singular forms "a," "an" and "the" include plural referents unless the context clearly dictates otherwise. Approximating language, as used herein throughout the specification and claims, may be applied to modify any quantitative representation that could permissibly vary without resulting in a change in the basic function to which it is related. Accordingly, a value modified by a term such as "about" is not to be limited to the precise value specified. In some instances, the approximating language may correspond to the precision of an instrument for measuring the value. Terms such as "first," "second," etc. are used to identify one element from another, and unless otherwise specified are not meant to refer to a particular order or number of elements. Unless otherwise specified, the terms AC, AC signal, AC current, AC electricity, AC electric current, and variants thereof all refer to an alternating current electrical waveform. Similarly, the term DC, DC signal, DC current, etc. all refer to a direct current electrical waveform, unless otherwise specified.

As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances the modified term may sometimes not be appropriate, capable, or suitable. For example, in some circumstances an event or capacity can be expected, while in other circumstances the event or capacity cannot occur—this distinction is captured by the terms "may" and "may be."

The foregoing examples are illustrative of some features of the invention. The appended claims are intended to claim the invention as broadly as has been conceived and the examples herein presented are illustrative of selected embodiments from a manifold of all possible embodiments. Accordingly, the appended claims are not limited to the illustrated features of the invention by the choice of examples utilized. As used in the claims, the word "comprises" and its grammatical variants logically also subtend and include phrases of varying and differing extent such as for example, but not limited thereto, "consisting essentially of" and "consisting of" Where necessary, ranges have been supplied, and those ranges are inclusive of all sub-ranges therebetween. It is to be expected that variations in these ranges will suggest themselves to a practitioner having ordinary skill in the art and, where not already dedicated to the public, the appended claims should cover those variations.

Advances in science and technology may make equivalents and substitutions possible that are not now contemplated by reason of the imprecision of language; these variations should be covered by the appended claims. This written description uses examples to disclose the invention, including the best mode, and also to enable any person of ordinary skill in the art to practice the invention, including making and using any devices or systems and performing any incorporated methods. The patentable scope of the invention is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

What is claimed is:

1. An apparatus, comprising:
    plural alternators that are drivable by plural engines for producing AC electric currents;
    a rectifier in electrical communication with at least one of the alternators for producing a DC electric current;
    an inverter in electrical communication with the rectifier for producing a second AC electric current; the second AC electric current having at least one of a designated an acceptable frequency or a designated voltage, and the inverter in electrical communication with one or more electric loads responsive to the second AC electric current;
    an energy storage device that is able to electrically couple to at least one of the alternators, the rectifier, or the inverter;
    wherein one of the alternators comprises a generator system drivable by a constant-speed engine to produce one of the AC electric currents, the constant-speed engine being one of the plural engines; and
    the alternators being operable to produce at least one of voltages or the currents that are independent of one or more of the engine speeds or the power outputs.

2. The apparatus of claim 1, wherein the rectifier is one of a plurality of rectifiers, and each alternator has a corresponding one of the plurality of rectifiers in electrical communication therewith, and each alternator is operable to supply a constant voltage to the corresponding rectifier in response to a variable speed input of the engine coupled thereto, the alternators being operable to supply the constant voltage by at least one of modifying a field current of the engines coupled with the alternators or modifying one or more of a current or voltage supplied to exciters of the alternators.

3. The apparatus of claim 2, wherein each of the alternators is separately controllable such that differing power inputs to each of the alternators results in the same voltage output.

4. The apparatus of claim 1, wherein the energy storage device is electrically coupled to the rectifier, and the energy storage device comprises a DC-DC converter and a battery.

5. The apparatus of claim 1, wherein the energy storage device is electrically coupled to at least one of the alternators.

6. The apparatus of claim 1, wherein the energy storage device is electrically coupled to the inverter.

7. The apparatus of claim 1, further comprising a DC bus and a switch, the DC bus carrying the DC electric current from the rectifier or a DC current from another source, and the switch interposed between the DC bus and electrical loads, the switch having a state for energizing the electrical loads from the DC bus and a second state for energizing the electrical loads from the generator system.

8. The apparatus of claim 7, further comprising an additional energy storage device, and the additional energy storage device is coupled to the generator system such that the switch is interposed between the additional energy storage device and the loads.

9. The apparatus of claim 1, wherein the controller responds to a command for low motive power by stopping or reducing the engine speed of only one variable speed engine of the engines.

10. The apparatus of claim 1, wherein one of the engines is a variable speed engine that provides a non-zero, but different, amount of power, via a corresponding one of the alternators, to a propulsion motor relative to another of the engines that is a variable speed engine.

11. The apparatus of claim 1, wherein the controller controls the energy storage device to charge from only one of the alternators during use.

12. The apparatus of claim 1, wherein the one or more electric loads comprise propeller motors, thrust motors, and other non-motor loads; and the energy storage device is chargeable from an off-board source.

13. A system comprising the apparatus of claim 1, wherein the apparatus provides propulsion force and is responsive to the controller and operable to generate electricity for onboard loads of a marine vessel or an off-highway vehicle that travels on routes other than public streets or highways.

14. The system of claim 13, further comprising a constant-speed engine for supplying electrical energy to non-motor loads.

15. The system of claim 13, wherein the controller is operable to differentially control a speed of the engines in response to a signal that corresponds to one or more of vehicle speed, emission levels, consumption, or equipment life.

16. The apparatus of claim 1, further comprising one or more of:
    a controller that is operable to control at least one of engine speeds of the engines or power outputs of the engines, or
    a switch operable to couple the energy storage device to a load.

17. An apparatus, comprising:
    a plurality of alternators each driven by a respective variable speed engine for producing a respective first AC electric signal;
    a plurality of rectifiers each in electrical communication with a respective one of the alternators for producing a respective DC electric signal;
    a DC bus connected to an output of at least one of the rectifiers;
    an inverter in electrical communication with the DC bus for producing a second AC electric signal;
    a electric load in electrical communication with the inverter and responsive to the second AC electric signal;
    an energy storage system coupled to the DC bus for controllably receiving electrical power from the DC bus and providing electrical power to the DC bus
    a constant speed engine;
    a generator system coupled to an output of the constant speed engine for producing a third AC electric signal; and
    at least one switch electrically connected to the inverter and to the generator system for selectively providing the second and third AC electric signals, respectively, to a second electric load.

18. An apparatus, comprising:
    an alternator driven by a variable speed engine for producing a AC electric signal;
    a rectifier in electrical communication with the alternator for producing a DC electric signal;
    a DC bus connected to an output of the rectifier;

an inverter in electrical communication with the DC bus for producing a second AC electric signal;

a electric load in electrical communication with the inverter and responsive to the second AC electric signal;

an energy storage system coupled to the DC bus for controllably receiving electrical power from the DC bus and providing electrical power to the DC bus;

a generator system coupled to an output of a constant speed engine for producing a third AC electric signal; and at least one switch electrically connected to the inverter and to the generator system for selectively providing the second and third AC electric signals, respectively, to a second electric load.

* * * * *

UNITED STATES PATENT AND TRADEMARK OFFICE
CERTIFICATE OF CORRECTION

PATENT NO. : 8,330,291 B2  
APPLICATION NO. : 12/572512  
DATED : December 11, 2012  
INVENTOR(S) : Ajith Kuttannair Kumar Page 1 of 1

It is certified that error appears in the above-identified patent and that said Letters Patent is hereby corrected as shown below:

In the Claims

Claim 1 at column 11, lines 24-25, Delete "an acceptable", therefor

Claim 17 at column 12, line 53, Insert -- ; -- after "bus"

Signed and Sealed this
Fifteenth Day of July, 2014

Michelle K. Lee
*Deputy Director of the United States Patent and Trademark Office*